UNITED STATES PATENT OFFICE.

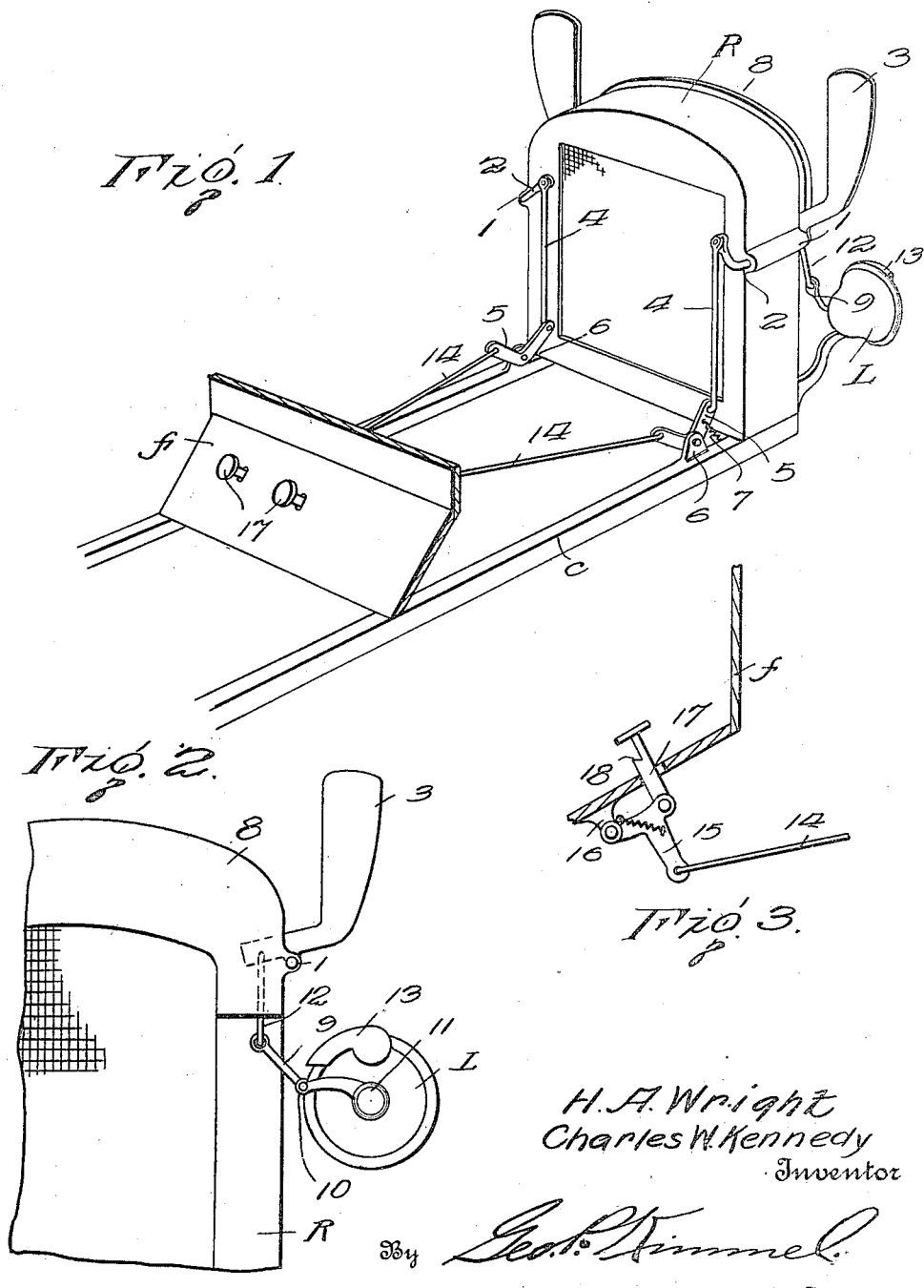

HERBERT A. WRIGHT AND CHARLES W. KENNEDY, OF CLARENCE, MISSOURI.

DIRECTION-INDICATOR.

1,267,035.  Specification of Letters Patent.  Patented May 21, 1918.

Application filed September 24, 1917. Serial No. 192,969.

*To all whom it may concern:*

Be it known that we, HERBERT A. WRIGHT and CHARLES W. KENNEDY, citizens of the United States, and residents of Clarence, in the county of Shelby and State of Missouri, have invented certain new and useful Improvements in Direction-Indicators, of which the following is a specification.

This invention relates to signal apparatus for vehicles, and it is the principal object of the invention to provide a signaling means adapted for arrangement upon the forward end of a vehicle, and capable of being controlled by the operator of the vehicle, whereby the direction to be taken can be signaled to oncoming and following vehicles and pedestrians previous to the steering of the vehicle; the device being especially desirable for use upon vehicles traversing congested traffic centers.

Another and equally important object of the invention is to provide dual signaling means whereby the device will be rendered clearly visible in darkness as well as light.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:

Figure 1 is a fragmentary perspective of a motor driven vehicle chassis having our improved signaling apparatus applied to the opposite sides of the radiator thereof;

Fig. 2 is a fragmental front elevation of the radiator; and

Fig. 3 is detail in section showing the foot operating means whereby the signaling means is actuated.

Referring now more particularly to the drawings and in connection with which like reference characters will designate corresponding parts throughout the several views, C represents the vehicle chassis and R the radiator thereof. A portion of the vehicle body flooring is shown and designated by the numeral *f*.

Horizontally disposed bearings 1 are arranged upon the opposite sides of the radiator R and receive therethrough crank arms 2 having semaphore arms 3 fixedly mounted upon the outer extremities thereof. The inner ends of the crank arms are apertured and pivotally connected to operating rods 4, which operating rods extend downwardly along the radiator or in pivotal engagement with bell crank levers 5 pivotally mounted in bearings 6 arranged upon the opposite sides of the vehicle chassis C. Contractile springs 7 are engaged with portions of the bell crank levers 5 and with the adjacent portions of the sides of the vehicle chassis C serving as means for normally maintaining the semaphore arms 3 in their inoperative or non-signaling positions.

A curved strip 8 is arranged adjacent the curved upper portion of the outer face of the radiator R in spaced relation therefrom and serve as means for receiving and concealing the semaphore arms 3 when the same are returned to their inoperative or non-signaling positions.

Other arms 9 are pivotally supported in bearings 10 arranged upon the sides of the vehicle headlights L and have their outer ends provided with colored lenses 11, which lenses are adapted to be swung downwardly at times, over the sources of light. The inner ends of each of the arms 9 are apertured and are engaged by links 12, which links extend upwardly into engagement with the inner ends of the semaphore arms 3, thus, interconnecting the same. Secured to the upper marginal edges of the headlight lenses are shields 13, the same conforming in shape and design to the arms 9 and their respective lenses 11, thus, providing for means whereby the lenses 11 and the portions of the said arms carrying the same will be concealed in their inoperative or non-signaling positions.

Other operating rods 14 are pivotally connected to the opposite ends of the bell crank levers 5 and extend rearwardly of the same vehicle chassis into pivotal engagement with levers 15 also pivotally mounted in bearings 16 upon the under side of the vehicle flooring *f*. As shown in the Fig. 3, these levers 15 are offset intermediate their ends and are provided with apertures whereby foot pedals 17 may be connected to the same. It is to be also noted, that the shacks of the foot pedals 17 are provided with shoulders 18, which shoulders are adapted to be engaged with the edges of the slot formed in the said flooring through which the same pass. Thus, by depressing the foot pedal 17, the shoulders 18 will engage portions of the flooring and maintain the same in their depressed positions for a desired period of time.

In operation, the operator depresses one of the foot pedals 17, depending upon the direction in which the vehicle is to be turned. Such movement of the pedal will cause rotation of the crank arm 2 connected thereto and as a consequence, its respective semaphore arm 3 will be rotated or moved to its signaling position, as shown in the Fig. 1. Inasmuch as the adjacent arm 9 is connected to the semaphore arms 3, it will also be understood that movement of the said arm 9 will be also caused, thus, bringing the colored lens 11 arranged thereon directly over the source of light and allowing the signal to be readily discerned in darkness. The pedal 17 as before stated, may be held in its depressed position due to the shoulders 18 and as a consequence, the semaphore and the adjacent arm 9 can be held in signaling position until the turn is made, allowing the operator of the vehicle to devote his entire attention to the steering of the vehicle.

Manifestly, the construction shown is capable of considerable modification, and such modification as is within the scope of our claims, we consider within the spirit of our invention.

We claim:

1. A direction indicator, including in combination with a vehicle and the headlight thereof, semaphore arms pivotally mounted upon the opposite sides of the forward end thereof, other pivotal arms mounted adjacent the semaphore arms having transparent portions and movable over the headlights, said pivotal arms being connected to the semaphore arms and means arranged in the vehicle and connected to the arms for independently moving the opposite pairs.

2. A direction indicator, including, in combination with a vehicle and the headlights thereof, semaphore arms pivotally mounted upon the opposite sides of the forward end of the vehicle, other pivotal arms mounted adjacent the semaphore arms having transparent portions adapted to be swung over the headlights, said semaphore arms and pivotal arms being interconnected, and manually operable means arranged in the vehicle connected to the semaphore and pivotal arms for independently moving the oppositely disposed pairs.

3. A direction indicator, including in combination with a vehicle and the headlights thereof, semaphore arms pivotally mounted upon the opposite sides of the forward end of the vehicle, a curved shield arranged adjacent and in spaced relation to the top of the forward end of the vehicle, pivotal arms mounted adjacent the semaphore arms and having portions thereof transparent and adapted to be swung over the vehicle headlights at times, and manual means arranged in the vehicle for independently operating the opposite pairs of arms.

4. A direction indicator, including in combination with a vehicle and the headlights thereof, arms pivoted upon the sides of said headlights and carrying transparent lenses in certain of the ends thereof, said lenses being adapted to be swung over the headlights at times, and means arranged in the vehicle and connected to said arms for independently operating the same.

5. A direction indicator, including, in combination with a vehicle and the headlights thereof, arms pivotally mounted upon the sides of said headlights and carrying transparent lenses in certain of the ends thereof, curved shields carried by the headlights for concealing said arms when the same are arranged in non-signaling positions, and manually operable means arranged in the vehicle and connected to the arms for independently moving the same.

In testimony whereof, we affix our signatures hereto.

HERBERT A. WRIGHT.
CHARLES W. KENNEDY.

Copies of this patent may be obtained for five cents each, by addressing the "Commissioner of Patents, Washington, D. C."